United States Patent Office 3,510,310
Patented May 5, 1970

3,510,310
ARTIFICIALLY SWEETENED BEVERAGES
AND MIXES THEREOF
Robert G. Breckwoldt, Middletown, N.Y., assignor, by mesne assignments, to The Pillsbury Company, Minneapolis, Minn., a corporation of Delaware
No Drawing. Filed Feb. 11, 1966, Ser. No. 526,719
Int. Cl. A23l 1/00
U.S. Cl. 99—28                            18 Claims

ABSTRACT OF THE DISCLOSURE

Presweetened beverage mix consisting essentially of N-cyclohexylsulfamic acid, an edible water-soluble amino carboxylic acid, an edible water-soluble organic acidulent. The mix is reconstituted to provide a beverage having texture and mouthfeel similar to a beverage sweetened with sugar.

---

This invention relates to low calorie dietetic food composition. More particularly, the present invention relates to food compositions containing an amino carboxylic acid and cyclohexylsulfamic acid.

It is an object of the present invention to provide a synthetically sweetened beverage mix which upon the addition of an aqueous medium closely assimilates sugar in respect to mouthfeel and texture.

Another object of the present invention is to provide a tart-tasting, synthetically sweetened beverage which assimilates sugar-sweetened beverages.

A further object of the invention is to provide a dry beverage mix which upon the addition of an aqueous medium substantially eliminates the aftertaste of artificially sweetened beverages.

Artifically sweetened beverages possess several adverse concomitant properties which limit the use thereof as a substitute for sugar-sweetened beverages. Included principally among the adverse properties are a lack of texture and mouthfeel sufficiently similar to that of the sugar-sweetened beverages. Moreover, despite numerous attempts to eliminate the concomitant aftertaste, the art has achieved only limited success in attempting to closely approximate the taste, mouthfeel and texture characteristics of sugar.

According to the present invention there is provided a dry mix and a beverage containing the following ingredients in parts by weight:

An edible water-soluble amino carboxylic acid ____ 5-25
N-cyclohexylsulfamic acid _____ 1-4
An edible water-soluble organic acidulent _____ 1-5 wherein the ratio of amino carboxylic acid to N-cyclohexylsulfamic acid ranges from at least 1:1 to about 25:1.

The edible water-soluble amino carboxylic acids employed in the present invention mixes are those edible amino carboxylic acids that exhibit a solubility of at least five grams in one liter of water at 20° C. Exemplary organic amino carboxylic acids include those edible acids wherein the amino and carboxylic acid groups are linked via a saturated aliphatic hydrocarbon group. Illustrative amino carboxylic acids include those water-soluble, edible amino carboxylic acids represented by the general formula:

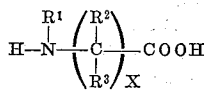

wherein $R^1$ is a monovalent group selected from the group consisting of lower alkyl (e.g., 1–5 carbon atoms), cycloaliphatic (e.g., 4–8 carbon atoms) and hydrogen, $R^2$ and $R^3$ are monovalent groups selected from the group consisting of hydrogen, lower alkyl and cycloaliphatic and X is an integer of a value ranging from 1 to 6. Typical edible amino carboxylic acids include glycine, alanine, valine, N-ethyl glycine, N-butyl glycine, N-cyclohexyl glycine, Isovaline, 1-aminoisobutanoic acid, 2-aminobutanoic acid, 3-aminobutanoic acid, 4-aminobutanoic acid, 4-(N-methylamino) butanoic acid, 2-aminohexanoic acid, Lysine, methionine, mixtures thereof and the like. Exceptional results are obtained wherein the edible amino carboxylic acid is glycine.

Edible water-soluble organic acidulents adaptable to the dry mixes include the mono and polycarboxylic organic acids such as adipic, citric, fumaric, malic, lactic, tartaric and succinic acids and mixtures thereof. Also adaptable are the cold water-soluble fumaric and adipic acids which generally include an additional surfactant to enhance the solublility thereof such as disclosed in U.S. Patents, 3,151,986 by J. H. Van Ness; 3,152,909 by S. P. Raffensperger et al.; 3,016,299 and 3,016,300 by S. P. Raffensperger et al. and 3,181,953 by J. H. Van Ness et al.; 3,169,872 by R. L. Rau et al. Superior results are achieved via the use of unmodified adipic acid in combination with N-cyclohexylsulfamic acid and the organic amino carboxylic acid, particularly glycine, in the amounts hereinbefore stated.

In a preferred embodiment of the present invention, there is provided dry beverage mixes and beverages containing about 10 parts by weight of an edible amino carboxylic acid, about 1 to about 4 parts by weight N-cyclohexylsulfamic acid and from about 1 to about 5 parts by weight of an organic acid acidulent.

In a more limited aspect of the present invention, there is provided beverages and beverage mixes containing in addition to the aforementioned acids, an edible water-soluble viscosity agent in an amount sufficient to provide an aqueous medium with a viscosity greater than that of water (e.g., greater than 1.005 centipoises at 20° C.) Illustrative water-soluble viscosity agents are the hydrocolloids that provide a hydrocolloid solution having a viscosity greater than water when 0.25 gram of the hydrocolloid are dispersed in 100 ml. of water at 20° C. Typical viscosity agents include sodium carboxymethylcellulose, sodium alginate, gum arabic, gum karaga, guar gum, okra gum, carrageenin, methylcellulose, ethylcellulose, sodium carrageenate, hydrolyzed collagen, dehydrated gelation, gelatinized starch, polyvinylpyrolidene, mixtures thereof and the like. The amount of water-soluble viscosity agent added to the beverage mix generally ranges from about 0.4 to about 2 parts by weight per 10 parts by weight of edible amino carboxylic acid and preferably ranges from about 0.75 to about 1.5 parts by weight per 10 parts by weight of edible amino carboxylic acid. The preferred hydrocolloid is sodium carboxymethylcellulose.

The instant dry mixes may be prepared by a variety of means such as dry blending of the ingredients, spray drying, agglomeration, drum drying and other conventional means of providing a dry mix of uniform consistency.

Various flavoring agents, clouding agents, dyes, preservatives, antioxidants, buffering agents, nutritional additives (e.g., vitamins) and the like conventionally added to dry beverage mixes and beverages are adaptable herein.

Beverages may also be prepared by directly admixing the beverage mix ingredients separately or any combination thereof into water followed by agitation thus providing a beverage. In general, the amount of water and mix should be sufficient to provide a suitable beverage. Typical employable amounts range from about 1 to about 4 parts by weight of N-cyclohexylsulfamic acid to about 1,000 parts by weight of water and preferably about 1,000 parts by weight of water to about 1 to about 3 parts by weight of N-cyclohexylsulfamic acid.

The following examples are illustrative of the invention:

EXAMPLE I

Orange drink

An orange drink was prepared from the following ingredients and proportions thereof:

| Ingredients: | Grams |
|---|---|
| Glycine | 100 |
| Cyclamic acid | 12 |
| Adipic acid | 35 |
| Sodium carboxymethylcellulose | 8 |
| Clouding agent [1] | 30 |
| Flavoring agent [2] | 6 |
| Dye | 0.27 |

[1] Cloud base sold by Beatrice Foods Co. containing about 50% by weight hydrogenated vegetable oil on a gum arabic carrier.
[2] Imitation Orange Juice Flavor sold by Polak's Frutal Works, Inc. containing about 25% flavor oil on a gum carrier.

In preparing the artificially sweetened orange drink, all the ingredients except the flavor were dry blended in a ball mill. The flavor was then added to the aforementioned dry blend followed by additional dry blending for a period of time sufficient to provide an admixture thereof. The admixture was then added to 10 quarts of water, followed by stirring or shaking for 30–60 seconds. For comparative purposes, a dry orange mix containing the following ingredients and proportions thereof was prepared by the aforementioned procedure.

| Ingredients: | Grams |
|---|---|
| Sugar | 750 |
| Adipic acid | 35 |
| Sodium carboxymethylcellulose | 8 |
| Clouding agent [1] | 30 |
| Flavoring agent [2] | 6 |
| Dye | 0.27 |
| Calcium cyclamate | 10.15 |
| Saccharin calcium | 0.85 |
| Adipic acid | 35 |
| Sodium carboxymethylcellulose | 8 |
| Clouding agent [1] | 30 |
| Flavoring agent [2] | 6 |
| Dye | 0.27 |

[1] See Example I for footnote 1.
[2] See Example I for footnote 2.

Upon testing the aforementioned orange drink, it was observed that the orange drink containing glycine and N-cyclohexyl sulfamic acid was very similar to that containing sugar in respect to texture, taste and mouthfeel. The orange drink containing the calcium cyclamate and saccharin calcium was characterized by the lack of the texture, taste and mouthfeel characteristic when compared to the orange sugar-sweetened drink. Comparison of panel preference tests between the aforementioned orange drinks containing the calcium cyclomate with that of the invention indicated a clear preference for the latter. Addition of 100 grams of glycine to the drink containing calcium cyclamate and saccharin calcium failed to provide any benefits thereover.

EXAMPLE II

Pineapple-grapefruit drink

A pineapple-grapefruit drink was prepared from the following ingredients and proportions thereof:

| Ingredients: | Grams |
|---|---|
| Glycine | 50 |
| Cyclohexylsulfamic acid | 20 |
| Citric acid | 30 |
| Sodium carboxymethylcellulose | 8 |
| Dry clouding agent [3] | 0.8 |
| Flavoring agent [4] | 12 |
| Dye | 0.1 |

[3] 37% hydrogenated vegetable oil and 5% glyceryl abietate on gum arabic carrier.
[4] Imitation Pineapple-Grapefruit Juice Flavor sold by Polak's Frutal Works, Inc., containing about 25% flavor oil on a gum carrier.

In preparing the artificially sweetened pineapple-grapefruit drink, all the ingredients except the flavor were dry blended in a ball mill. The flavor was then added to the aforementioned dry blend followed by additional dry blending for a period of time sufficient to provide an admixture thereof. A drink was prepared by adding to the admixture 10 quarts of water followed by mechanical stirring for a sufficient period of time to effect homogenous dispersion of the drink mix therein (about 30 seconds). The resultant drink possessed superior mouthfeel and texture. Sweetness level was enhanced by the combination of cyclohexylsulfamic acid, glycine and citric acid without a concomitant off-taste.

In a similar manner, tart-tasting artificially sweetened beverage mixes may be prepared by employing other edible organic acidulents or mixtures thereof such as fumaric, malic, lactic, tartaric and succinic acids.

EXAMPLE III

In order to ascertain the effect of the organic acidulent, the following drink mixes and resultant beverages in the gram amounts listed in Table I, according to the method of Example I, were prepared.

Beverages were prepared by adding 10 quarts of water to each of the batches below and compared by testing.

TABLE I

| | Glycine | Cyclohexyl-sulfamic acid | Adipic acid | Sodium carboxymethylcellulose | Cloud | Flavoring agent | Dye |
|---|---|---|---|---|---|---|---|
| Run I | 100 | 12 | 35 | 8 | 30 | 6 | 0.27 |
| Run II | 100 | 15 | 0.0 | 8 | 30 | 6 | 0.27 |
| Run III | 100 | 20 | 0.0 | 8 | 30 | 6 | 0.27 |
| Run IV | 100 | 30 | 0.0 | 8 | 30 | 6 | 0.27 |
| Run V | 100 | 40 | 0.0 | 8 | 30 | 6 | 0.27 |
| Run VI | 100 | 50 | 0.0 | 8 | 30 | 6 | 0.27 |
| Run VII | 100 | 60 | 0.0 | 8 | 30 | 6 | 0.27 |
| Run VIII | 100 | 70 | 0.0 | 8 | 30 | 6 | 0.27 |
| Run IX | 50 | 50 | 0.0 | 8 | 30 | 6 | 0.27 |
| Run X | 50 | 60 | 0.0 | 8 | 30 | 6 | 0.27 |
| Run XI | 50 | 70 | 0.0 | 8 | 30 | 6 | 0.27 |

Run I produced a satisfactory orange drink similar in characteristics to that of Example I. Beverages from Runs II–VIII did not contain the organic acidulent. However, the acidity thereof was supplied by increasing the amount of cyclohexylsulfamic acid. Run II had extremely poor taste and weak flavor. As the cyclohexylsulfamic acid was increased in Runs III–VIII, flavor and sweetness was increased as well as the off-taste. It was also noted that as the level of cyclohexylsulfamic acid was increased in the beverage, the beverage developed an adverse cloying sweet taste (i.e., lacking the tart taste typical of and necessary for beverages). For comparative purposes, similar tests were run by increasing the glycine level while holding the cyclohexylsulfamic acid constant in the absence of the adipic acid. It was observed that low levels of glycine failed to provide the necessary sweetness and flavor thereof (e.g., Runs IX–XI). At increased levels of glycine, the beverage developed an adverse bland, cloying taste. Employment of inorganic acids (e.g., phosphoric acid) in amounts sufficient to provide a comparable acidity as a substitute for the organic carboxylic acids failed to provide an acceptable beverage.

EXAMPLE IV

Orange drink

An orange drink was prepared pursuant to dry mix procedure of Example I from the following ingredients and proportions thereof:

| Ingredients: | Grams |
|---|---|
| Glycine | 120 |
| Adipic acid | 8 |
| Cyclamic acid | 5.6 |
| Clouding agent[5] | 2.4 |
| FD / C Yellow #5 | 0.48 |
| FD / C Yellow #6 | 0.048 |
| Benzoic acid | 0.48 |
| Imitation orange juice flavor[2] | 2.8 |

[5] "Beatreme 1292B" sold by Beatrice Foods Co.
[2] See Example I for footnote 2.

The above ingredients were then mixed to provide one gallon of orange drink.

What is claimed is:

1. A beverage consisting essentially of the following ingredients in parts by weight:

| | Parts by weight |
|---|---|
| Water | 1000 |
| Edible water-soluble amino carboxylic acid | 5–25 |
| N-cyclohexylsulfamic acid | 1–4 |
| Edible water-soluble organic acidulent | 1–5 | wherein the ratio of amino carboxylic acid to N-cyclohexylsulfamic acid ranges from at least 1:1 to about 25:1.

2. The beverage according to claim 1 wherein the edible amino carboxylic acid is an alpha-monoamino, monocarboxylic acid and the water-soluble acid is at least one member selected from the group consisting of adipic, fumaric, citric, malic, lactic, tartaric and succinic acid.

3. The beverage according to claim 2 wherein the amino carboxylic acid is glycine and the beverage contains from about 0.75 to about 1.5 parts by weight sodium carboxymethylcellulose for each 10 parts by weight glycine therein.

4. A dry beverage mix consisting essentially of an admixture of the following ingredients in parts by weight:
at least one edible water-soluble amino carboxylic acid;
N-cyclohexylsulfamic acid; and
at least one edible water-soluble organic acidulent
wherein the ratio of amino carboxylic acid to N-cyclohexylsulfamic acid ranges from at least greater than 1:1 to about 25:1 and the amount of ediable water-soluble organic acidulent therein ranges from about 1 to about 5 parts by weight for each 10 parts by weight of said amino carboxylic acid.

5. A dry beverage drink mix according to claim 4 wherein the amino carboxylic acid is at least one edible acid represented by the general formula:

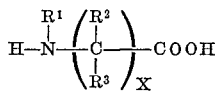

wherein $R^1$ is a member selected from the group consisting of lower alkyl, cycloaliphatic and hydrogen, $R^2$ and $R^3$ are members selected from the group consisting of hydrogen, lower alkyl and cycloaliphatic and X is an integer of a value ranging from 1 to 6.

6. The dry beverage mix according to claim 4 wherein the edible amino carboxylic acid is an alpha-monoamino, monocarboxylic acid.

7. The dry beverage mix consisting essentially of the ingredients according to claim 6 wherein the water-soluble acid is at least one member selected from the group consisting of adipic, fumaric, citric, malic, lactic, tartaric and succinic acid.

8. The dry beverage mix according to claim 7 wherein the amount of edible amino carboxylic acid contained in the dry mix ranges from 5 to 15 parts by weight and the ratio of amino carboxylic acid to N-cyclohexylsulfamic acid ranges from at least greater than 1:1 to about 15:1.

9. The dry beverage mix according to claim 7 wherein the amino carboxylic acid is glycine.

10. The dry beverage mix according to claim 9 wherein the organic acid is adipic acid.

11. The dry beverage mix according to claim 9 wherein the organic acid is citric acid.

12. The dry beverage mix according to claim 9 wherein the organic acid is fumaric acid.

13. The dry beverage mix according to claim 9 wherein the organic acid is malic acid.

14. The dry beverage mix according to claim 10 wherein the ingredients in parts by weight range from about 10 parts by weight glycin, from about 1 to about 3.5 parts by weight N-cyclohexylsulfamic acid and from about 1 to about 5 parts by weight adipic acid.

15. The dry beverage mix according to claim 10 wherein the ingredients in parts by weight range from about 10 parts of glycine, from about 1 to about 3.5 parts N-cyclohexylsulfamic acid and from about 1 to about 5 parts citric acid.

16. The dry beverage mix according to claim 11 wherein the ingredients in parts by weight range from about 10 parts glycine, from about 1 about 3.5 parts N-cyclohexylsulfamic acid and from about 1 to about 5 parts fumaric acid.

17. The dry beverage mix according to claim 13 wherein the ingredients in parts by weight range from about 10 parts by weight glycine, from about 1 to about 3.5 parts N-cyclohexylsulfamic acid and from about 1 to about 5 parts malic acid.

18. A dry beverage mix consisting essentially of an admixture of the following ingredients in parts by weight:
glycine;
sodium carboxymethylcellulose;
N-cyclohexylsulfamic acid; and
at least one water-soluble organic acidulent selected from the group consisting of adipic, fumaric, citric, malic, lactic, tartaric and succinic acid wherein the ratio of glycine to N-cyclohexylsulfamic acid ranges from at least greater than 1:1 to about 25:1, the amount of edible water-soluble organic acidulent therein ranges from about 1 to about 5 parts by weight for each 10 parts by weight of said glycine, and the amount of sodium carboxymethylcellulose therein ranges from about 0.75 to about 1.5 parts by weight for each 10 parts by weight of said glycine.

References Cited

UNITED STATES PATENTS

| 2,876,107 | 3/1959 | Jucaitis et al. | 99—141 |
| 3,023,106 | 2/1962 | Common | 99—78 |
| 3,082,091 | 3/1963 | Smith et al. | 99—78 |
| 3,105,792 | 10/1963 | White | 167—57 |

FOREIGN PATENTS

| 602,572 | 8/1960 | Canada. |
| 369,141 | 7/1958 | Japan. |

A. LOUIS MONACELL, Primary Examiner

S. B. DAVIS, Assistant Examiner

U.S. Cl. X.R.

99—78, 141